Jan. 2, 1962 I. G. AKMENKALNS 3,015,740

COINCIDENT DIODE GATING PRODUCING AN OUTPUT RESULTING FROM CURRENT OVERSHOOT

Filed Dec. 19, 1958

*INVENTOR*
IVARS G. AKMENKALNS
*BY* G. R. Gugger
*AGENT*

United States Patent Office 3,015,740

Patented Jan. 2, 1962

3,015,740

COINCIDENT DIODE GATING PRODUCING AN OUTPUT RESULTING FROM CURRENT OVERSHOOT

Ivars G. Akmenkalns, Endicott, N.Y., assignor to International Business Machines Corporation, New York, N.Y., a corporation of New York Filed Dec. 19, 1958, Ser. No. 781,769
3 Claims. (Cl. 307—88.5)

The present invention relates to diode gating circuits and more particularly to current mode operated diode gating circuits wherein the gating is effected when a current level is shifted.

The development of transistor circuitry in the last few years has been characterized by the adherence to certain "modes" of operation. The mode is usually identified by a particular signal amplitude or range of voltage levels with the current mode or current switching operating within a signal range of 0.3 to 3.0 volts. The current mode of operation has significant advantages due to the fact that less power is required. Also, very high speed logical devices can be built, and the operation of large portions of certain high speed computers at a frequency up to ten megacycles is made possible. In many computer systems, the present invention may be advantageously employed to control, for example, current operated monostable and bistable multivibrator circuits.

In the present invention, the gate signal is applied to a resistor-indicator branch connected to a common point to which the input or a sample signal is applied. Energy from the gating signal is stored in the inductor which opposes an instantaneous change in current. A diode is normally reverse biased, but when a sample pulse is applied during the occurrence of a gate signal, the inductor discharges through the diode to provide a current pulse through the load.

Accordingly, a principal object of the present invention is to provide a current mode operated diode gating circuit.

Another object of the present invention is to provide a current mode inductor-resistor gate which stores energy in the inductor and transfers this energy into the load network when a current level is shifted.

Other objects of the invention will be pointed out in the following description and claims and illustrated in the accompanying drawings, which disclose, by way of example, the principle of the invention and the best mode, which has been contemplated, of applying that principle.

Figure 1:
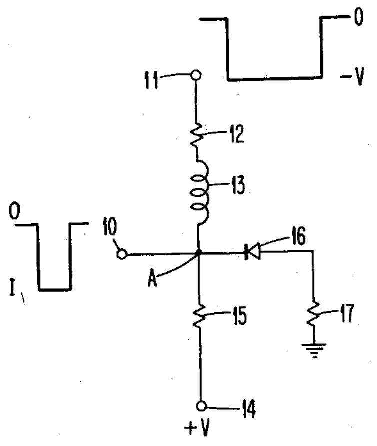
FIG. 1 is a schematic circuit diagram of a current mode operated diode gate employing a resistor-inductor branch in accordance with the present invention.

Referring to the drawings, there is shown in FIG. 1 a diode gating circuit for gating current pulses applied from a suitable current source, not shown, to an input terminal 10 under the control of gating signal pulses applied to a terminal 11 from a suitable source, not shown. The gating signals are applied through a series RL branch, comprising the resistor 12 and inductor 13, to a common point A to which the input or sample signals are directly applied. The common or node voltage point A is connected to a positive voltage terminal 14 through a resistor 15 and also is shown connected to the cathode of a diode 16. The plate circuit of the diode is connected to ground through a load resistor 17.

Figure 2:
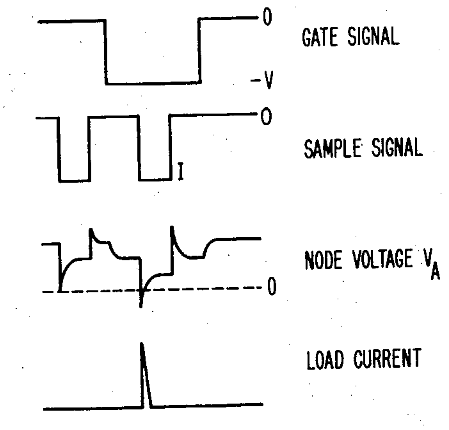
FIG. 2 is a diagram of waveforms illustrating the operating characteristics of the circuit of FIG. 1.

In the operation of the circuit, diode 16 is normally reverse biased, and the application of a sample input pulse to the terminal 10 will result in a flow of current through resistor 15 to the positive terminal 14 causing the node voltage at point A to be driven negative. As shown in FIG. 2, in the absence of the negative gate signal at terminal 11, this negative spike at A will not go below 0 volts, and the diode 16 will remain biased in the reverse direction. The voltage at point A will settle in a positive direction until termination of the sample pulse at which point it reverts to its original no signal level.

Assuming now that the gate potential at terminal 11 changes from the 0 voltage level to a negative voltage level, there results an increase in the flow of current through the resistor 12, inductor 13 and resistor 15 to the positive terminal 14. Energy will be stored in the inductor 13 in the form of an electromagnetic field, and the node voltage at point A will be driven negative slightly due to the voltage drop across resistor 15. This node voltage will settle at a level which is still well above 0, and the diode 16 remains reverse biased.

If prior to the termination of the negative gate signal a sample current pulse is applied to the terminal 10, the inductor 13 will not permit an instantaneous change in the magnitude of the current in the resistor 12, inductor 13 branch, and thus, the increase in current through resistor 15 will cause the node voltage at point A to drop below 0. Diode 16 now becomes forward biased, and the inductor will return the stored energy to the circuit and sustain current flow of a decreasing magnitude through the diode, load resistor 17 and ground. A load current will flow as long as the inductor will sustain a current above a threshold magnitude. As shown in FIG. 2, as soon as the node voltage settles above 0, the diode becomes reverse biased and load current ceases to flow. The current threshold is controlled by the gate level, and by returning the gate back to the 0 voltage level, this threshold will be increased and the diode will remain reverse biased preventing a load current.

Figure 4:
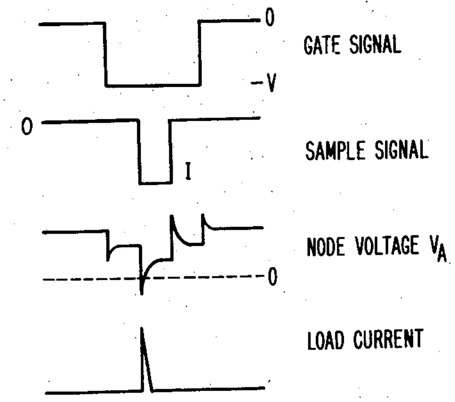
FIG. 4 is a diagram of waveforms illustrating the operating characteristics of the circuit of FIG. 3.
Figure 3:
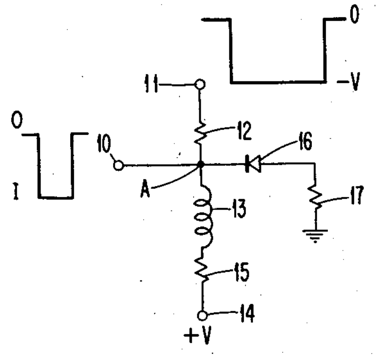
FIG. 3 is a schematic circuit diagram of another embodiment of the current mode operated diode gate employing a resistor-inductor branch.

In the circuit shown in FIG. 3, wherein parts corresponding to FIG. 1 are provided with the same reference characters, it will be noted that here the gate signal is applied to resistor 12 and the inductor 13-resistor 15 branch is now connected between the node point A and the positive voltage terminal 14. By comparing the waveforms shown in FIGS. 2 and 4, it will be seen that in the circuit configuration of FIG. 1, the gate signal is integrated whereas in the configuration shown in FIG. 3, the gate signal is differentiated. The embodiment shown in FIG. 3 has the advantage that if the gate and sample signals occur simultaneously, they will aid each other and a very fast gate is produced.

In the present gating circuit, then, energy is stored in a reactive element (inductor) as soon as the gate is conditioned, and this energy is used at the beginning of a sample pulse to provide an output signal. With the proper arrangement of polarities throughout the circuit, an output pulse could also be delivered at the termination of the sample pulse. Also, since energy is stored in the inductor whenever the gate is conditioned and whenever the sample pulse occurs, with the proper setting of the various levels and polarities, it is possible to make some of this energy available as a short pulse indicative of the coincidence of the two signals.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention.

It is the intention, therefore, to be limited only as indicated by the scope of the following claims.

What is claimed is:

1. A diode gating circuit for selectively passing applied current pulses in response to voltage control signals comprising, a diode having a cathode and an anode, an input terminal connected to said cathode, a source of bias voltage, a resistor connecting said bias voltage with said input terminal and establishing a voltage level at said cathode for rendering said diode normally reverse biased, a load circuit connected to said anode, a branch circuit comprising a resistor and inductor in series connected to said input terminal, means for applying a voltage control signal to said branch circuit whereby current flow in said branch circuit and bias circuit will cause electrical energy to be stored in said inductor and the voltage level at said input terminal to be shifted, and a current source connected to said input terminal whereby a shift in current level will cause increased current flow in said bias circuit and a further shift in the voltage level at said input terminal which forward biases said diode and transfers said stored electrical energy to said load circuit.

2. A diode gating circuit for selectively passing applied current pulses in response to voltage control signals comprising, a diode having a cathode and an anode, an input terminal connected to said cathode, a source of bias voltage, a resistor and inductor in series between said bias voltage source and said input terminal for establishing a voltage level at said cathode which renders said diode normally reverse biased, a load circuit connected to said anode, a voltage control signal source, a resistor connecting said signal source with said input terminal whereby a change in level of said signal voltage results in current flow in said resistor-inductor circuit and a voltage level shift at said input terminal, electrical energy being stored by said inductor, and a current source connected to said input terminal whereby a shift in current level will cause increased current flow in said second resistor and a further shift in the voltage level at said input terminal which forward biases said diode and transfers said stored electrical energy to said load circuit.

3. A diode gating circuit for selectively passing applied current pulses in response to voltage control signals comprising, a diode having an input terminal, biasing means electrically connected to said input terminal, said biasing means establishing a potential level at said input terminal which renders said diode normally reverse biased, a load circuit connected to said diode, a branch circuit connected to said input terminal and including a resistor and an inductor in series, means for applying a voltage control signal to said branch circuit whereby electrical energy will be stored in said inductor and the potential level at said input terminal will be shifted, and means for applying the current pulses to be passed to said input terminal whereby the potential level at said input terminal will be shifted again sufficiently to forward bias said diode, the electrical energy stored in said inductor discharging as current flow to said load circuit.

References Cited in the file of this patent

UNITED STATES PATENTS

| | | |
|---|---|---|
| 2,685,039 | Scarbrough et al. | July 27, 1954 |
| 2,687,473 | Eckert et al. | Aug. 24, 1954 |
| 2,748,270 | Eckert et al. | May 29, 1956 |
| 2,887,676 | Hamilton | May 19, 1959 |
| 2,941,095 | DeMiranda | June 14, 1960 |